2 Sheets--Sheet 1.

E. COWLES.

Mechanical Movements for Sewing-Machines, &c.

No. 5,481. Reissued July 8, 1873.

Witnesses.
G. E. Wait
S. A. Wood.

Inventor.
Edwin Cowles
by his attorney
N. C. Lombard

AM. PHOTO-LITHOGRAPHIC CO. N.Y. (OSBORNE'S PROCESS.)

2 Sheets--Sheet 2.

E. COWLES.

Mechanical Movements for Sewing-Machines, &c.

No. 5,481. Reissued July 8, 1873.

Witnesses.

G. E. Whitney

S. A. Wood.

Inventor.

Edwin Cowles
by his Attorney
N. C. Lombard.

AM. PHOTO-LITHOGRAPHIC CO. N.Y. (OSBORNE'S PROCESS.)

UNITED STATES PATENT OFFICE.

EDWIN COWLES, OF CLEVELAND, OHIO, ASSIGNOR, BY MESNE ASSIGNMENTS, TO EDWIN HOLMES, OF NEW YORK CITY.

IMPROVEMENT IN MECHANICAL MOVEMENTS FOR SEWING-MACHINES, &c.

Specification forming part of Letters Patent No. 103,847, dated June 7, 1870; reissue No. 5,481, dated July 8, 1873; application filed May 26, 1873.

*To all whom it may concern:*

Be it known that I, EDWIN COWLES, of Cleveland, in the county of Cuyahoga and State of Ohio, have invented a new and Improved Mechanical Movement; and I do hereby declare that the following is a full, clear, and exact description thereof, reference being had to the accompanying drawing making part of this specification, in which—

Figure 1:
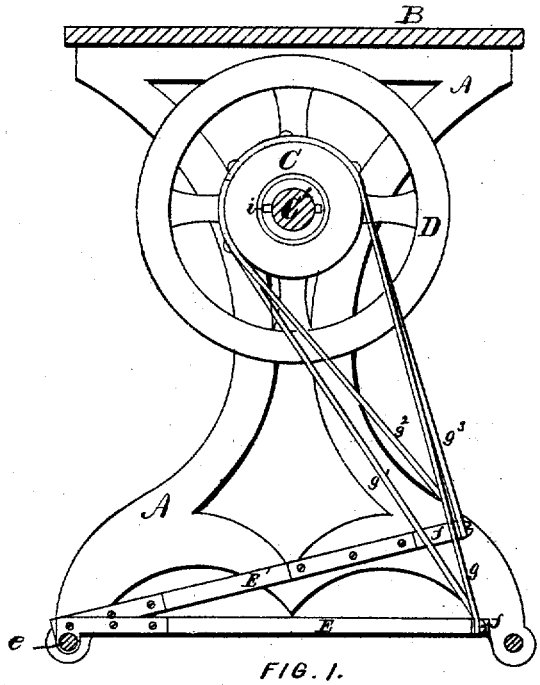
Figure 2:
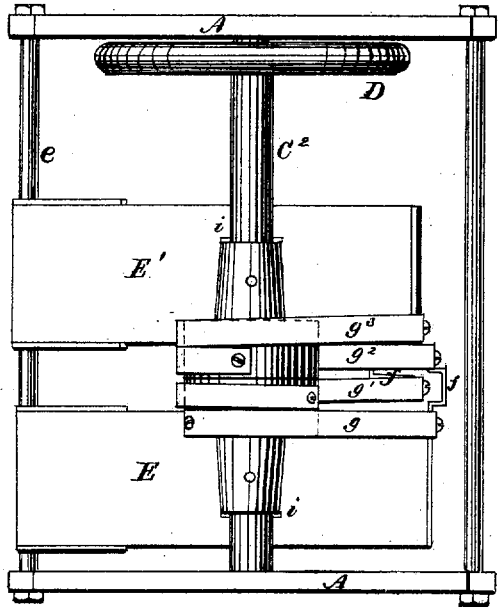
Figure 3:
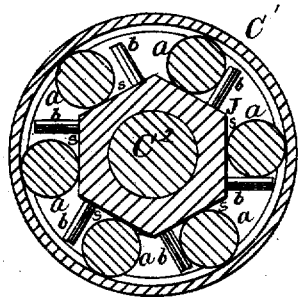
Figure 4:
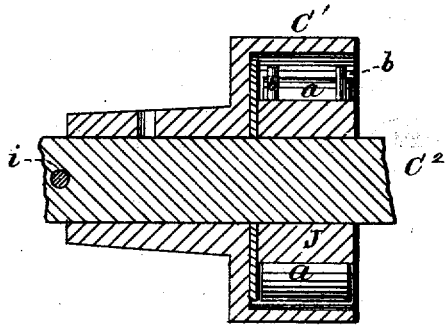
Figure 5:
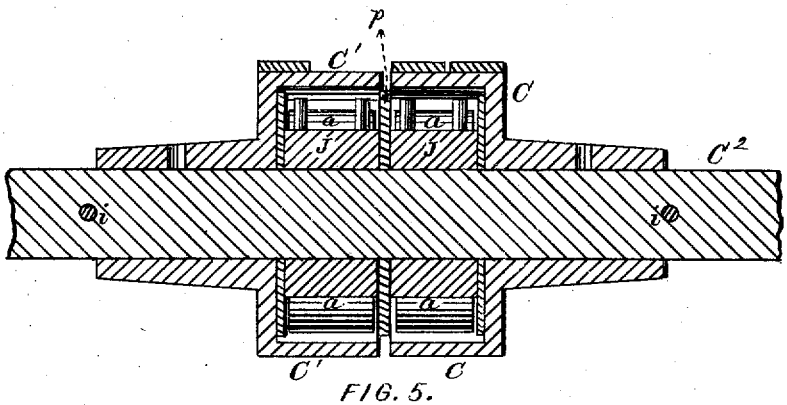

Figure 1, Plate 1, is a vertical cross-section of a table having my improved device applied to it. Fig. 2, Plate 1, is a top view of the device as seen by removing the table-top. Figs. 3, 4, and 5, Plate 2, are sectional views of the improved device.

Similar letters of reference indicate corresponding parts in the several figures.

This invention relates to an improved mechanical movement which is especially designed to afford ease in operating sewing machinery, lathes, and other light machinery where it is desired to transmit a continuous rotary movement from an alternate pedal or treadle movement.

The nature of my invention consists, first, in the arrangement of cylinders or rollers between prismatic hubs which are fast on a shaft, and the flanges of hollow pulleys which are placed loosely upon such shaft, whereby alternate oscillating movements given to the said pulleys will communicate rotary motion in one direction to the shaft through the medium of the rollers or rolling clutches, as will be hereafter explained; second, in a double treadle-movement combined with oscillating pulleys, so constructed that while two connecting-belts are employed for each pulley these belts shall not be crossed, and their ends shall be in line when the treadles are both in the same plane, as will be hereafter explained.

To enable others skilled in the art to understand my invention, I will explain its construction and operation.

In the accompanying drawing I have represented my improved mechanical movement applied to the fly-wheel shaft $C^2$ of a sewing-machine table, A B, for which purpose the invention is especially intended, for reasons hereinafter explained. On the shaft $C^2$ two hexagonal enlargements or hubs, J J, are formed or applied in any suitable manner, and separated by a circular disk, *p*, which is of greater diameter than the hubs J, and concentric to the axis of the shaft $C^2$. Similar disks are applied on this shaft $C^2$, at the outer ends of the hubs, as shown in Fig. 5. Between the disks rollers *a*, of cylindrical form, are applied, one roller corresponding to each one of the flat surfaces *s*, and surrounding the rollers are pulleys C $C^1$, which have long hubs, and which are applied loosely on the shaft $C^2$, and prevented from endwise displacement by the pins *i i*. Around the pulley C straps or belts $g$ $g^1$ are applied in opposite directions, one end of said straps being secured to the pulley C, and the other ends thereof being secured, one to the offset *f* on each of the treadles E and E′, in such a manner that a downward movement of the treadle E will cause the pulley C to revolve in one direction, and a downward motion of the treadle E′ will cause it to revolve in the opposite direction. The pulley $C^1$ is similarly provided with straps $g^2$ $g^3$, the lower ends of which are similarly connected, one to the treadle E and the other to the treadle E′, in such a manner that a downward movement of either treadle will cause both of the pulleys C and $C^1$ to revolve, but in opposite directions. The treadles E E′ are pivoted or hinged to the front bar *e*, and the straps or belts $g$ $g^1$ $g^2$ $g^3$ are all attached to the offsets of the free ends of the treadles, so that when the treadles are in the same plane the points of attachment of the straps will all be in the same line.

By the arrangement of the straps as above described it will be seen that when one treadle is depressed the other is raised; that at each descent of a treadle one of the pulleys is turned in the direction indicated by the arrow in Fig. 3, and gives an impulse in the same direction to the shaft $C^2$, through the medium of the rollers *a* acting between the flat surfaces *s* of a hub, J, and the inner surface of the contiguous pulley; at the same time the other pulley is turned backward loosely upon the shaft $C^2$.

The hubs J may present more or less than six plane sides, *s*, and from each side, near the angle, studs *b b* project, which are designed to afford a support for a roller, *a*, when it is not acting on its pulley.

It will be seen, by reference to Fig. 3, Plate 2, that on one side of the shaft $C^2$ the rollers *a* are resting upon their respective studs *b b*, while on the opposite side of this shaft the rollers *a* are wedged in between the inner surface of the pulley $C^1$ and the surface *s s s* of the hub J, thus clutching or engaging this pulley with its shaft $C^2$. The studs *b b* are so arranged on their respective sides *s* of the hub J, with reference to the diameter of the rollers *a*, that on one side of the shaft $C^2$, when the rollers rest upon the studs *b*, the rollers will not bind against the pulley, but will be held loosely in such positions that, as they successively begin to ascend from a point below the shaft $C^2$, they will roll back and bind between the surfaces *s* and the inner surface of the pulley. Then, as the rollers successively pass a point above the shaft $C^2$, they will drop down by their own gravity and lie upon the studs *b*, free from the pulley C. By this means the pulleys C and $C^1$ are alternately engaged with and disengaged from their shaft, producing no friction which could in any manner retard the free rotation of the shaft, and only acting at the moment of impulse given to one or the other of the treadles; consequently there will be little or no wear on the parts, and the motion of the shaft $C^2$ will be free and smooth.

In practice, the rollers *a* will have their surfaces chilled or otherwise hardened, so that they will preserve their cylindricity, and not become indented by falling upon their studs, or being held in the bite between the hubs and their respective pulleys.

It is a well-known fact that many of the female operatives on sewing machinery wherein the oscillating pedal-movements are employed are seriously injured in health in consequence of the abnormal strain upon the muscles of the legs, abdomen, and back. This is owing, in part, to the fact that with such devices no opportunity is afforded of resting the limbs by changing their position and scope of movement.

It will be seen, from the above description, that I have applied to the shaft $C^2$ of the balance-wheel D a device which is comparatively frictionless, and by means of which a regular fast or slow speed can be imparted to said shaft by giving either regular or irregular, fast or slow, long or short, movements to the treadles E and E′; also, that the purchase or leverage on the pulleys C and $C^1$ is uniform at all times, and there is no "dead-center;" also, that the feet can be moved about on the treadles as the comfort or convenience of the operative may dictate.

What I claim as new, and desire to secure by Letters Patent of the United States, is—

1. A mechanical movement consisting of rolling clutches *a*, applied between many-sided hubs J, and pulleys which are applied loosely on the shaft of said hubs, substantially as described.

2. The stops or studs *b*, in combination with rollers *a* and hubs J, inclosed by pulleys, so as to operate substantially as described.

3. Offsets *f f* on the treadles E and E′, arranged to receive the lower ends of the pulley-straps without having these straps crossed, as set forth.

4. The combination of two independent treadles, E E′, and two clutch mechanisms, arranged to impart rotary motion to a fly-wheel, pulley, or shaft by alternate intermittent actions thereof, when each of said treadles is connected to both clutch mechanisms by two straps, belts, or other flexible connections, one end of both of which is secured to the toe end of a treadle, and the other ends of which are connected, one to each clutch mechanism, but upon opposite sides of the axis thereof, substantially as described.

EDWIN COWLES.

Witnesses:
WM. PRATT,
A. T. HUBBARD.